(12) United States Patent
Ikuta et al.

(10) Patent No.: US 10,254,839 B2
(45) Date of Patent: Apr. 9, 2019

(54) IMPACT FEEDBACK OPERATION DEVICE

(71) Applicant: Toyo Denso Co., Ltd., Tokyo (JP)

(72) Inventors: Kenji Ikuta, Hidaka (JP); Miyuki Shimada, Wako (JP)

(73) Assignee: TOYO DENSO CO., LTD., Tokyo (JP)

( * ) Notice: Subject to any disclaimer, the term of this patent is extended or adjusted under 35 U.S.C. 154(b) by 33 days.

(21) Appl. No.: 15/483,450

(22) Filed: Apr. 10, 2017

(65) Prior Publication Data
US 2017/0293359 A1   Oct. 12, 2017

(30) Foreign Application Priority Data

Apr. 12, 2016 (JP) ................................. 2016-079397

(51) Int. Cl.
| | |
|---|---|
| *G06F 3/01* | (2006.01) |
| *B60K 35/00* | (2006.01) |
| *G06F 3/041* | (2006.01) |
| *B60K 37/06* | (2006.01) |

(52) U.S. Cl.
CPC .............. *G06F 3/016* (2013.01); *B60K 35/00* (2013.01); *B60K 37/06* (2013.01); *G06F 3/041* (2013.01); *B60K 2350/1024* (2013.01); *B60K 2350/1036* (2013.01); *B60K 2350/2039* (2013.01); *G06F 3/0416* (2013.01); *G06F 2203/04105* (2013.01)

(58) Field of Classification Search
CPC ........ G06F 3/016; G06F 3/041; G06F 3/0219; B60K 35/00; B60K 37/06; B60K 2350/1024; B60K 2350/1036; B60K 2350/2039; H05K 999/99

See application file for complete search history.

(56) References Cited

U.S. PATENT DOCUMENTS

| | | | | |
|---|---|---|---|---|
| 4,579,006 A | * | 4/1986 | Hosoda .................... | F03G 7/06 374/142 |
| 7,637,105 B2 | * | 12/2009 | Sizer ................... | B60C 23/0408 60/528 |
| 8,068,167 B2 | * | 11/2011 | Honda ..................... | G03B 3/10 348/357 |
| 8,136,356 B2 | * | 3/2012 | Takahashi ............... | F03G 7/065 219/497 |
| 2001/0002226 A1 | * | 5/2001 | Tanaka ..................... | G03B 1/48 396/440 |
| 2007/0280668 A1 | * | 12/2007 | Kubo ....................... | G02B 7/04 396/133 |
| 2008/0247748 A1 | * | 10/2008 | Tanimura ................ | G02B 7/08 396/502 |

(Continued)

FOREIGN PATENT DOCUMENTS

JP          5835276 B2      12/2015

*Primary Examiner* — Tom V Sheng
(74) *Attorney, Agent, or Firm* — Birch, Stewart, Kolasch & Birch, LLP (57) ABSTRACT

An impact feedback operation device includes a base member, an operation member having an operation part equipped with a touch sensor, an actuator having a shape memory alloy wire, a temperature sensor, a voltage sensor, and a processing unit. The processing unit determines an energization condition required for the shape memory alloy wire, depending on a detected temperature and a detected voltage. The operation part is fixed to the base member through an elastically deformable elastic portion.

10 Claims, 7 Drawing Sheets

(56) References Cited

U.S. PATENT DOCUMENTS

| | | | | |
|---|---|---|---|---|
| 2009/0034094 | A1* | 2/2009 | Noda | F03G 7/065 359/694 |
| 2010/0293940 | A1* | 11/2010 | Noda | F03G 7/065 60/527 |
| 2011/0102917 | A1* | 5/2011 | Noda | F03G 7/065 359/811 |
| 2011/0176047 | A1* | 7/2011 | Wakahara | F03G 7/06 348/335 |
| 2012/0212442 | A1* | 8/2012 | Uchida | G06F 3/016 345/173 |
| 2013/0003201 | A1* | 1/2013 | Noda | F03G 7/065 359/823 |
| 2013/0145760 | A1* | 6/2013 | Gondo | F03G 7/065 60/528 |
| 2013/0154984 | A1* | 6/2013 | Gondo | G06F 3/016 345/173 |
| 2015/0369222 | A1* | 12/2015 | Fujii | F03G 7/065 60/527 |

* cited by examiner

IMPACT FEEDBACK OPERATION DEVICE

CROSS-REFERENCE TO RELATED APPLICATION

This application is based upon and claims the benefit of priority from Japanese Patent Application No. 2016-079397 filed on Apr. 12, 2016, the contents of which are incorporated herein by reference.

BACKGROUND OF THE INVENTION

Field of the Invention:
The present invention relates to an impact feedback operation device for providing a virtual operation feeling for an operator when the operation device is operated by the operator.

Description of the Related Art:
Conventionally, there is known an operation device having a touch sensor on an operation part which is operated by touching of the operator's finger, in order to provide a virtual operation feeling (click feeling) to an operator when the operator operates the operation part, wherein shape memory alloy is used as an actuator (e.g., see Japanese Patent No. 5836276). In the operation device, shape memory alloy is contracted and expanded by Joule heating of the shape memory alloy for a short time period to thereby generate vibration (impact) instantaneously. By transmitting this vibration to the operation part which is touched by the operator's finger, the operator can feel the response (feedback) to pressing of the operation part, i.e., experience the operation feeling. Hereinafter, the operation device using shape memory alloy as an actuator will be referred to as an "impact feedback operation device".

SUMMARY OF THE INVENTION

The impact feedback operation device may be used in various environments. For example, in a usage environment, the ambient temperature or the input voltage may change significantly and an object where the device is mounted may be vibrated. As described above, the impact feedback operation device provides a virtual operation feeling to the operator by electrically heating the shape memory alloy to thereby generate desired vibration. Therefore, when the ambient temperature or the input voltage changes, it is not possible to operate the shape memory alloy at the desired vibration acceleration. Consequently, it may not be possible to provide a constant operation feeling to the operator.

Further, in the case where the impact feedback operation device is provided in an environment where vibration occurs, if there is backlash or clearance between the shape memory alloy as the actuator and its peripheral components, abnormal noises may be generated due to the vibration, and rattling (wobbling) occurs at the time of operating the operation part. Additionally, if rattling occurs, the vibration generated by the actuator can not be transmitted to the operation part efficiently, and it is not possible to provide a clear operation feeling to the operator. On the other hand, if the components are fixed together too tightly for eliminating the clearance which may cause rattling, since vibration generated by the actuator is attenuated, it is not possible to transmit the vibration to the operation part efficiently, and it is not possible to provide a clear operation feeling to the operator.

The present invention has been made taking the problems of this type, and an object of the present invention is to provide an impact feedback operation device in which it is possible to provide a constant operation feeling to an operator even in the case where the ambient temperature or the input voltage fluctuates, or an object where the impact feedback operation device is installed vibrates.

In order to achieve the above object, an impact feedback operation device according to the present invention includes a base member fixed to an object structural body, or formed integrally with the object structural body, an operation member fixed to the base member, and an actuator including shape memory alloy. The operation member has an operation part equipped with a touch sensor. At least the operation part is displaceable relative to the base member. The actuator is configured to move the operation part relative to the base member by deformation of the shape memory alloy at the time of Joule heating. Further, the impact feedback operation device includes a temperature detection unit configured to detect ambient temperature, a voltage detection unit configured to detect input voltage supplied from the object structural body, and a processing unit configured to control the actuator. The processing unit determines an energization condition required for the shape memory alloy at the time of Joule heating, depending on temperature detected by the temperature detection unit and voltage detected by the voltage detection unit. The operation part is fixed to the base member through an elastically deformable elastic portion.

In the impact feedback operation device of the present invention which adopts the above structure, depending on the detected ambient temperature and the detected input voltage, an energization condition required for a desired operation of the shape memory alloy is determined, and the shape memory alloy is energized according to the determined energization condition. Thus, it is possible to generate a desired vibration acceleration (impact) in the shape memory alloy regardless of the environment (temperature changes or voltage fluctuations). Further, since the operation part of the operation member is fixed to the base member through the elastic portion, the stacked members of the impact feedback operation device tightly contact each other all the time.

In the structure, it is possible to increase the rigidity of the operation member, suppress rattling of the operation member with respect to the base member, and transmit vibration generated by the actuator to the operation part efficiently. Therefore, in the present invention, even under the environment where temperature changes, voltage fluctuations, and vibration occurs, it is possible to vibrate the operation part at a desired acceleration, and thus, provide a stable operation feeling (clicking feeling) to the operator.

In the above impact feedback operation device, the processing unit may be configured to calculate or select from a first map, quantity of heat required for actuation of the shape memory alloy, based on the temperature detected by the temperature detection unit, and calculate or select from a second map, energization pulse width for control of the shape memory alloy, based on the calculated quantity of heat and the voltage detected by the voltage detection unit.

In the structure, it is possible to reliably actuate the shape memory alloy at a desired vibration acceleration.

In the above impact feedback operation device, the base member may be provided with a first engagement portion, the operation member may be provided with a second engagement portion, and the first engagement portion and the second engagement portion may be engaged with each other through the elastic portion.

In the structure, by the elastic portion sandwiched between the first engagement portion and the second engagement portion, it is possible to absorb variation in the dimension of components, and ensure that the operating part has the sufficient range of movement. In the structure, it is possible to provide a clear operation feeling to the operator. Further, since the elastic portion is provided at the position where the first engagement portion and the second engagement portion are engaged with each other, it is possible to suppress the number of components, improve the productivity, and achieve cost reduction and size reduction of the product owing to simplification of structure. In the above impact feedback operation device, the elastic portion should be made of elastic material.

Therefore, the elastic portion can have a simple structure.

In the above impact feedback operation device, the elastic portion may be formed into a shape having spring property, and provided on the first engagement portion or the second engagement portion.

Also in this structure, the stacked members tightly contact each other all the time, and it is possible to suitably form the elastic portion which ensures that the operation member has the sufficient range of movement.

In the above impact feedback operation device, the base member may be provided with a first engagement portion, the operation member may be provided with a second engagement portion, the elastic portion may be formed into a shape having spring property, and the first engagement portion or the second engagement portion may be provided on the base member or the operation member through the elastic portion.

Also in this structure, the elastic portion can be configured in a manner that the stacked members tightly contact each other all the time, and it is possible to ensure that the operation member has the sufficient movable range.

In the above impact feedback operation device, the operation member may include a side wall provided with the second engagement portion, a thin-walled portion may be formed between the operation part and the side wall, the thin-walled portion being thinner than the operation part and surrounding the operation part.

In the structure, the rigidity is decreased at the position of the thin-walled portion, and transmission of vibration (impact) generated by the actuator to the side wall is suppressed. Therefore, it is possible to suppress attenuation of the vibration effectively. Accordingly, it is possible to transmit vibration from the actuator to the operation part efficiently, and provide an even more suitable operation feeling to the operator.

In the above impact feedback operation device, the operation member may include a side wall, a thin-walled portion may be formed between the operation part and the side wall, the thin-walled portion being thinner than the operation part and surrounding the operation part, and the thin-walled portion may form the elastic portion.

In the structure, by decreasing the rigidity at the position of the thin-walled portion, it is possible to allow the thin-walled portion to function as the elastic portion easily. Thus, with the simple structure, it is possible to absorb variation in the dimension of components, and ensure that the operation part has the sufficient movable range. Accordingly, it is possible to suppress transmission of vibration (impact) generated by the actuator to the side wall.

In the above impact feedback operation device, a fixing seat may be provided inside the thin-walled portion, and vibration generated by the actuator may be transmitted to the operation part through the fixing seat.

In the structure, vibration generated by the actuator can be transmitted to the operation part effectively.

The above impact feedback operation device may further include a guide mechanism configured to prevent inclination of the operation member relative to the base member and allow displacement of the operation member relative to the base member, and the guide mechanism may include a guide rail provided on the base member and a guide projection provided on the operation member slidably along the guide rail.

In the structure, vibration from the actuator can be transmitted to the operation part even more efficiently.

Preferably, the above impact feedback operation device is an in-vehicle operation device.

Significant changes in the temperature occur in the vehicle compartment easily, voltage fluctuations occur easily due to the traveling states of the vehicle (e.g., the operation state and the stop state of the engine, and the charging state of the electrical automobile), and vibration occurs during traveling. By using the impact feedback operation device as an in-vehicle operation device, even under the in-vehicle environment as described above, it is possible to provide a stable operating feeling to the operator, and prevent occurrence of abnormal noises due to vibration and rattling at the time of inputting control operations. Therefore, it is possible to reliably satisfy the requirements of quality for the in-vehicle components.

In the impact feedback operation device of the present invention, it is possible to provide a stable operation feeling to an operator even in the case where the ambient temperature or the input voltage changes or an object where the impact feedback operation device is installed is vibrated.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Hereinafter, preferred embodiments of an impact feedback operation device according to the present invention will be described with reference to the accompanying drawings.

The impact feedback operation device 10 shown in FIGS. 1 and 2 (hereinafter simply referred to as the "operation device 10") is configured to output a signal corresponding to an operation, to an object structural body 12 where the operation device 10 is mounted, in accordance with control operations inputted by touching of a finger of an operator, and provide a virtual operation feeling to the operator's finger.

Specifically, the operation device 10 includes a base member 14 fixed to (installed at) the object structural body 12, an operation member 16 fixed to the base member 14, an actuator 18 for moving at least an operation part 34 of the operation member 16, and a circuit board 20 on which electronic components are mounted.

In the embodiment, the object structural body 12 to which the base member 14 is fixed, i.e., the object structural body 12 (highly rigid body) where the operation device 10 is installed is a vehicle 13 (in particular, automobile). For example, the operation device 10 may be installed at any of locations of a steering wheel, an instrument panel, a center console, etc. provided in a vehicle compartment. The temperature in the vehicle compartment of the vehicle 13 may change significantly, e.g., depending on the location where the vehicle 13 is used, and depending on whether or not an air conditioner is used. Further, the supply voltage from the vehicle 13 may fluctuate significantly due to the operational status (operating or stopping) of the engine and the charging state of the electrical automobile. Further, vibration occurs during traveling of the vehicle.

It should be noted that the object structural body 12 where the operation device 10 is installed may be a vehicle 13 other than the automobile, such as a train.

Alternatively, the object structural body 12 may be any transportation means other than the vehicle 13, such as aircraft or boats and ships. Further, the object structural body 12 where the operation device 10 is installed may be a stationary structural body such as a building.

The base member 14 is a block-shaped member firmly fixed to the object structural body 12. A plurality of positioning projections 22 are provided on a bottom surface of the base member 14 in the illustrated example. In the state where the positioning projections 22 are inserted into a plurality of positioning holes 13a formed in the vehicle 13, the base member 14 is fixed firmly to the object structural body 12 using suitable tightening means such as screws without any rattling (wobbling). The base member 14 may be formed from a part of the vehicle 13. That is, the base member 14 may be formed integrally with the vehicle 13. Pedestals 24 are provided on an upper surface of the base member 14. The pedestals 24 protrude upward. In the illustrated example, three pedestals 24 are arranged at intervals. An actuator 18 is provided on one of the pedestals 24. Only one pedestal 24 may be provided. Alternatively, no pedestals 24 may be provided.

The base member 14 has claws 26. The claw 26 is one form of a first engagement portion which is engaged with an engagement hole 40 of the operation member 16 described later. The claws 26 are provided on side surfaces 15 of the base member 14. As shown in FIG. 1, each of the claws 26 includes a tapered surface 26a inclined relative to a side surface 15 in the thickness direction of the base member 14 indicated by an arrow A, and a lower surface 26b substantially perpendicular to the side surface 15. The claws 26 are provided at intervals in a circumferential direction of the base member 14. The number of the claws 26 is four in the illustrated example. In the case where the base member 14 has a substantially rectangular shape in a plan view, as shown in the illustrated example, at least one claw 26 should be provided on each of side surfaces 15 corresponding to mutually-opposed sides of the rectangular shape. The base member 14 may have a circular shape, an oval shape, or a polygonal shape other than the rectangular shape in a plan view.

In the embodiment of the present invention, as one form of an elastic portion which is deformable elastically, an elastic portion 28A made of elastic material such as elastomer is provided on each of the claws 26. Specifically, the elastic portion 28A is fixed to the lower surface 26b of the claw 26. The elastic portion 28A is fixed to each of the claws 26. Therefore, each of the claws 26 is engaged with the engagement hole 40 through the elastic portion 28A. The elastic portion 28A is interposed between the claw 26 and (the inner surface of) the engagement hole 40. Thus, the elastic portion 28A is compressed elastically in the thickness direction.

Figure 2:
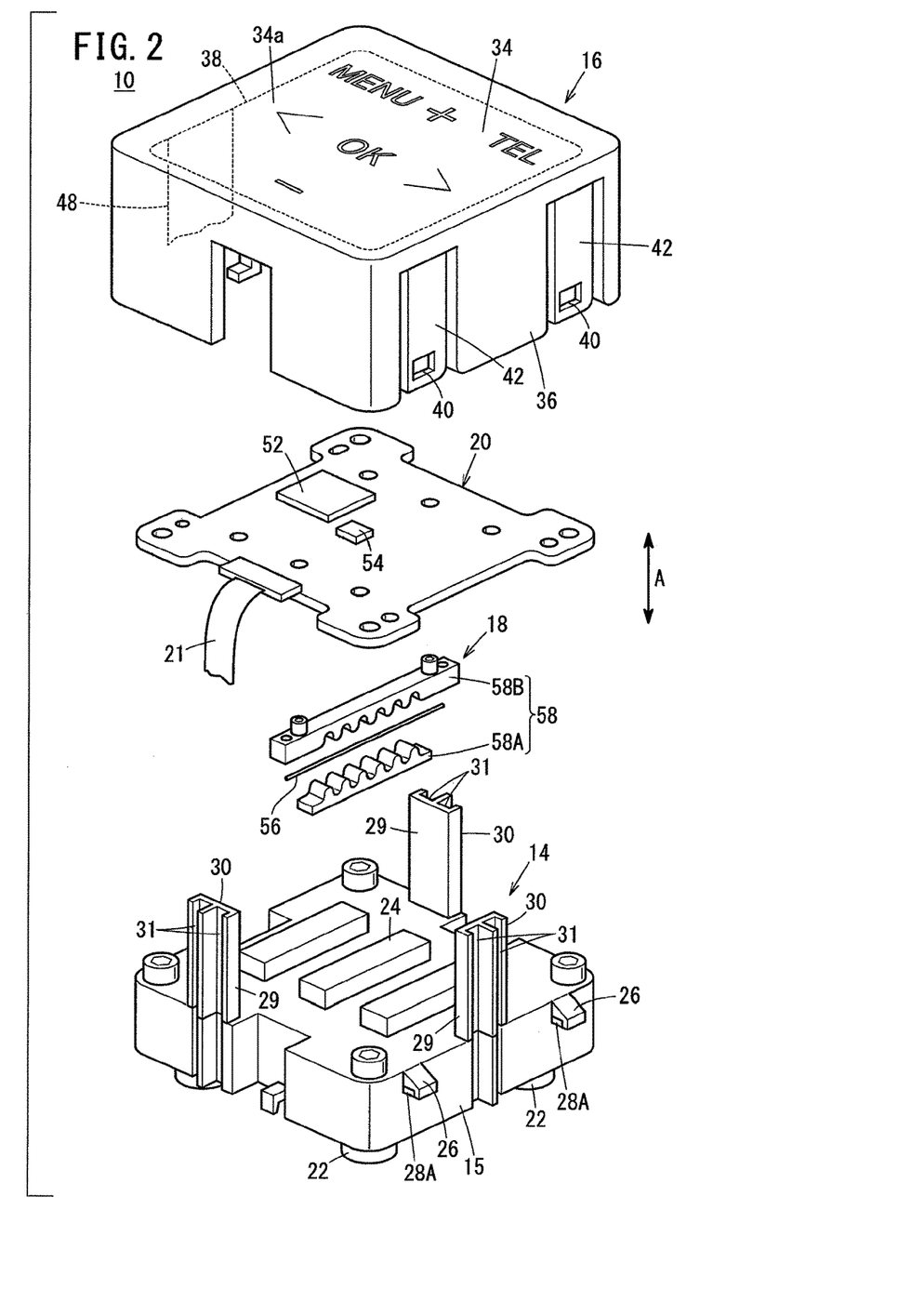
FIG. 2 is an exploded perspective view of the impact feedback operation device shown in FIG. 1.

As shown in FIG. 2, the base member 14 includes guide rails 30 extending in the thickness direction of the base member 14 indicated by the arrow A. As described later, the guide rails 30 have functions of allowing the operation member 16 to be displaced relative to the base member 14 in the thickness direction of the base member 14, and preventing inclination of the operation member 16 relative to the base member 14.

A plurality of guide rails 30 should be provided at intervals in a circumferential direction of the base member 14. In the illustrated example, the guide rails 30 are provided respectively on three sides of the base member 14 having a substantially rectangular shape in a plan view. A plurality of columns 29 protrude upward from marginal portions of an upper surface of the base member 14. Each of the guide rails 30 has guide grooves 31 formed in parallel to one another so as to extend from the side surface 15 of the base member 14 to the column 29. It should be noted that only one guide groove 31 may be formed in each of the guide rails 30.

In order to have a high rigidity, the base member 14 is made of hard material (e.g., hard resin such as polypropylene, polycarbonate). The base member 14 may be made of metal material.

The operation member 16 has an operation part 34 where a touch sensor sheet 38 (touch sensor) is provided, and side walls 36 protruding from an outer marginal portion of the operation part 34 toward one side in the thickness direction of the operation part 34 indicated by the arrow A (downward). The operation member 16 is formed into a box shape by the operation part 34 and the side walls 36. As in the case of the base member 14, the operation member 16 is made of hard material. In the illustrated example, as in the case of the base member 14, the operation member 16 has a substantially rectangular shape in a plan view. Alternatively, the operation member 16 may have a circular shape, an oval shape, or a polygonal shape other than the rectangular shape.

In the illustrated example, the operation member 16 has a substantially rectangular shape in a plan view, in correspondence with the base member 14 having a substantially rectangular shape in a plan view. In the illustrated example, the operation part 34 is in a form of a substantially rectangular plate having a flat front surface 34a and a back surface. An indication such as characters, graphic patterns, symbols, etc., is provided on the surface 34a of the operation part 34 in order to show operation items which can be inputted, to the operator.

The operation member 16 has the engagement hole 40 as one form of a second engagement portion engaged with the above described claw 26 (first engagement portion) provided on the base member 14. Specifically, the side wall 36 has plate-shaped elastic pieces 42 which can be deformed elastically in the thickness direction of the side wall 36. The engagement hole 40 is formed adjacent to a free end of the elastic piece 42. The elastic piece 42 is thinner than an area of the side wall 36 other than the elastic piece 42. The engagement hole 40 passes through the elastic piece 42 in the plate thickness direction of the elastic piece 42.

A plurality of (four) elastic pieces 42 each having the engagement hole 40 are provided in correspondence with the claws 26 provided on the base member 14. More specifically, two elastic pieces 42 are provided on each of the side walls 36 corresponding to the opposite sides of the operation member 16 having a substantially rectangular shape in a plan view. One elastic piece 42 may be provided on each of the side walls 36 corresponding to the opposite sides of the operation member 16. Alternatively, one elastic piece 42 may be provided for each of the side walls 36 corresponding to four sides of the operation member 16.

As described above, the claws 26 and the engagement holes 40 are engaged with each other through the elastic portions 28A made of elastic material. Therefore, the operation member 16 is elastically supported by and fixed to the base member 14.

Figure 3:
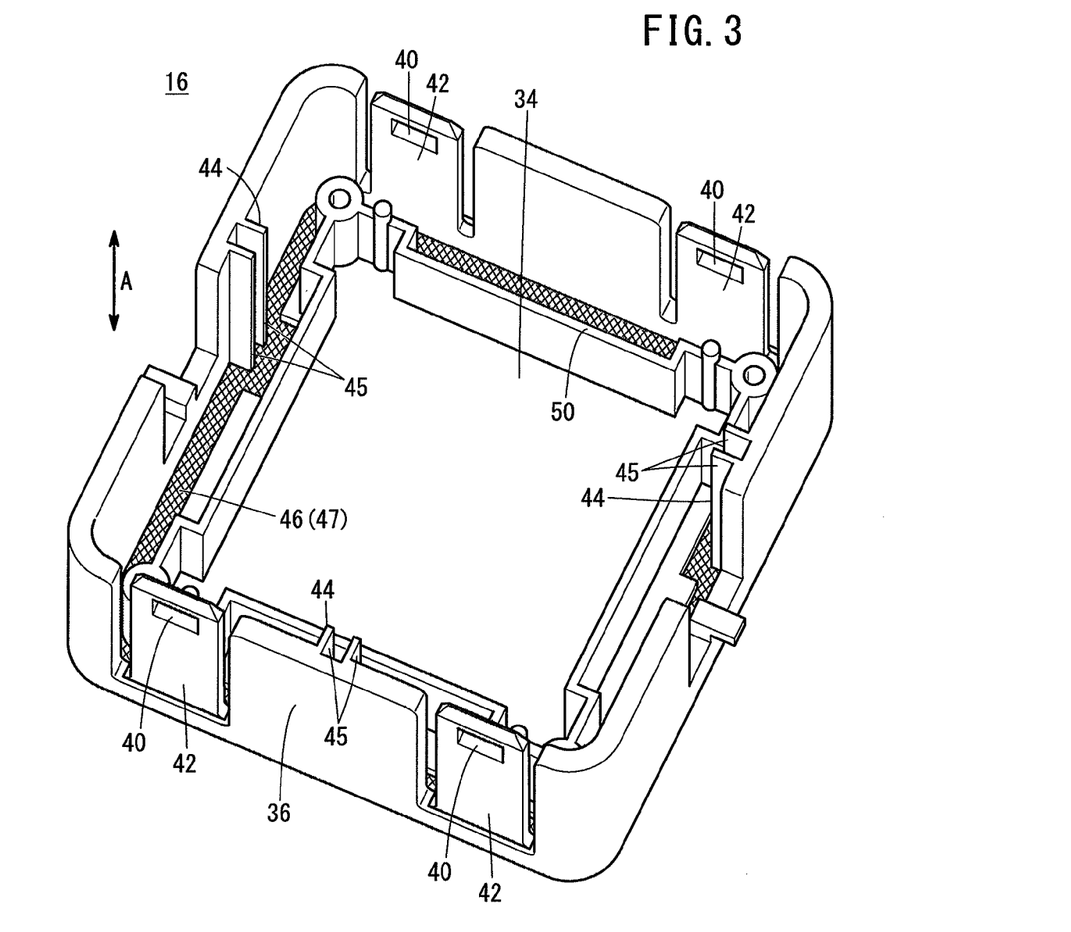
FIG. 3 is a perspective view of an operation member of the impact feedback operation device shown in FIG. 1, as viewed from the backside.

As show in FIG. 3, a plurality of (three, in the illustrated example) guide projections 44 are provided on the inner surface of the side wall 36. The guide projections 44 are slidable along the plurality of guide rails 30 (see FIG. 2) provided on the above described base member 14. Each of the guide projections 44 extends in the thickness direction of the operation part 34 indicated by the arrow A. Each of the guide projections 44 has two ribs 45 extending in parallel to each other. The two ribs 45 are slidably inserted into the two guide grooves 31 of the guide rail 30.

The above described guide rails 30 and guide projections 44 jointly form a guide mechanism which prevents inclination of the operation member 16 relative to the base member 14, and allows displacement of the operation member 16 relative to the base member 14.

A thin-walled portion 46 is provided between the operation part 34 and the side walls 36. The thin-walled portion 46 is thinner than the operation part 34, and surrounds the operation part 34. The thin-walled portion 46 is formed by providing a groove 47 in the outer marginal portion on the back surface of the operation part 34. Since the thin-walled portion 46 is thinner than the operation part 34, the rigidity of the thin-walled portion 46 is smaller than the rigidity of the operation part 34. Therefore, elastic deformation occurs at the thin-walled portion 46 easily. In FIG. 3, for ease of understanding, cross hatching is applied to the thin-walled portion 46 (groove 47).

A touch sensor sheet 38 shown in FIG. 2 is attached to the back surface of the operation part 34. When a finger of the operator contacts the surface 34a of the operation part 34, the touch sensor sheet 38 detects the contact position. In the illustrated example, the touch sensor sheet 38 has a substantially rectangular shape corresponding to the substantially rectangular operation part 34. A wiring line sheet 48 for signal transmission connected to an IC chip 52 described later extends from one side of the touch sensor sheet 38.

The circuit board 20 is provided between the base member 14 and the operation member 16, and connected to a vehicle wiring line through a harness 21. In the embodiment of the present invention, the circuit board 20 is fixed in close contact with the operation member 16 by suitable fixing means such as screws, etc. As shown in FIG. 1, a fixing seat 50 for fixing the circuit board 20 is provided (see also FIG. 3). The fixing seat 50 protrudes downward (toward the base member 14) from the outer marginal portion on the back surface of the operation part 34. The fixing seat 50 faces the side walls 36 of the operation member 16, and is circumferentially formed along the inside of the side walls 36. The fixing seat 50 is provided inside the thin-walled portion 46. A lower end of the fixing seat 50 protruding from the operation part 34 tightly contacts the circuit board 20.

As shown in FIG. 2, an IC chip 52 of a microcomputer for implementing computation/control required for operation of the operation device 10, and a temperature sensor (thermosensor) 54 (temperature detection unit) for detecting the ambient temperature are mounted on the circuit board 20. The IC chip 52 is electrically connected to the touch sensor sheet 38 through the wiring line sheet 48. Further, the IC chip 52 is electrically connected to the object structural body 12, and can transmit/receive signals to/from the vehicle 13 as the object structural body 12.

The actuator 18 has a shape memory alloy wire 56 and an insulating heat conductor 58, and the actuator 18 is fixed to the circuit board 20. The shape memory alloy wire 56 is connected to a power supply of the object structural body 12 through a switch 72 described later. Examples of a shape memory alloy (SMA) of the shape memory alloy wire 56 include nickel titanium alloy.

When the finger of the operator contacts the surface 34a of the operation part 34, the contact is detected by the touch sensor sheet 38, and the shape memory alloy wire 56 is energized. When the shape memory alloy wire 56 is energized, the shape memory alloy wire 56 is self-heated by Joule heat due to the internal resistance of the shape memory alloy wire 56. For example, this heat instantaneously causes contraction in the degree of several % of the original total length. When energization of the shape memory alloy wire 56 is stopped, and the temperature of the shape memory alloy wire 56 is decreased, the shape memory alloy wire 56 is extended, and returns to its original state.

The insulating heat conductor 58 is made up of a first member 58A and a second member 58B. The first member 58A is provided on the pedestal 24 of the base member 14 in a close contact manner. The second member 58B is fixed to the circuit board 20 in a close contact manner. Both ends of the shape memory alloy wire 56 are fixed to the second member 58B by fixing portions 62. It should be noted that the shape memory alloy wire 56 may be fixed to the first member 58A.

Figure 4A:
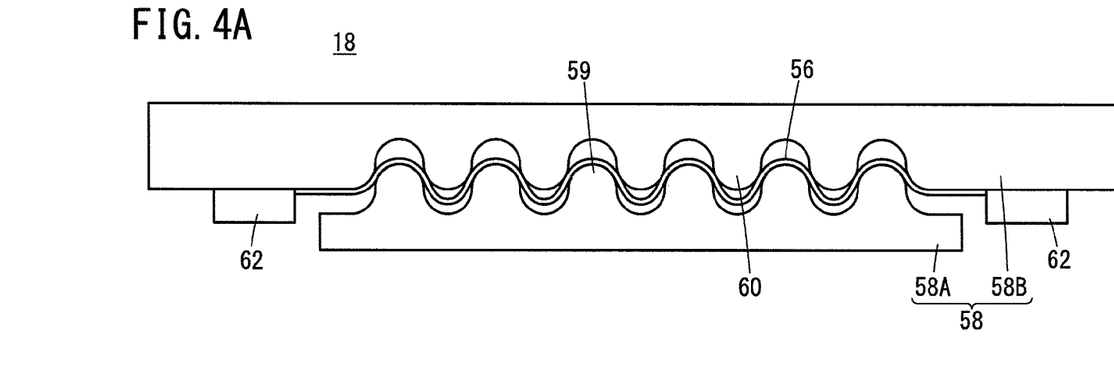
FIG. 4A is a schematic view showing a state where Joule heating of an actuator of the impact feedback operation device shown in FIG. 1 is not performed.

As shown in FIG. 4A, corrugated surfaces 59, 60 are formed on sides of the first member 58A and the second member 58B facing each other. Front ends of the corrugated surfaces 59, 60 are formed in circular arc shapes. The shape memory alloy wire 56 is sandwiched between the corrugated surfaces 59, 60 of the first member 58A and the second member 58B. Thus, the shape memory alloy wire 56 has a corrugated shape as well. FIG. 4A shows a state where the shape memory alloy wire 56 is not energized.

As described above, the claw 26 and the engagement hole 40 are engaged with each other through the elastic portion 28A. The operation member 16 is supported elastically by the base member 14. In the structure, the operation member 16 presses the actuator 18 against the base member 14. That is, the elastic restoring force of the elastic portion 28A is a pressing force pressing the actuator 18. Therefore, the first member 58A of the actuator 18 and the base member 14 are placed in close contact with each other all the time.

Figure 4B:
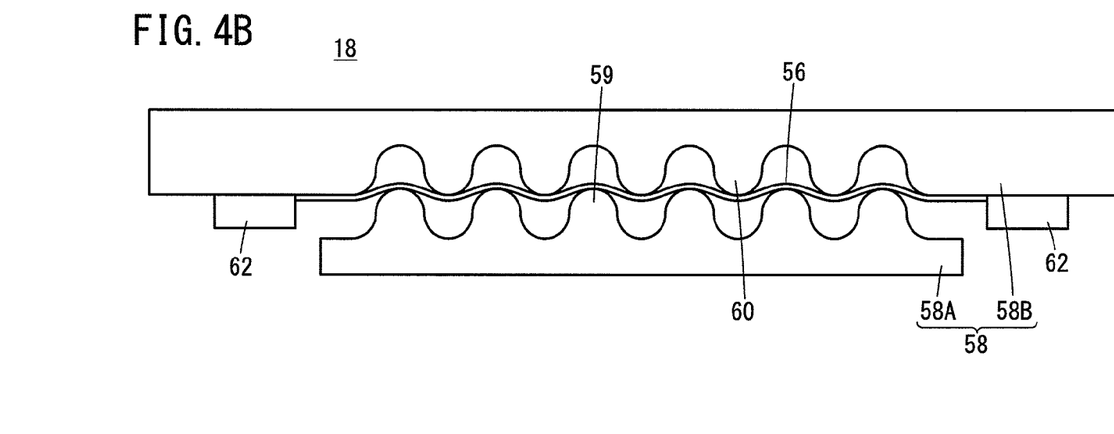
FIG. 4B is a schematic view showing a state where Joule heating of the actuator of the impact feedback operation device shown in FIG. 1 is performed.

When the shape memory alloy wire 56 is energized, and the shape memory alloy wire 56 is contracted, as shown in FIG. 4B, the second member 58B is displaced relative to the first member 58A, in a direction away from the first member 58A. Then, when energization of the shape memory alloy wire 56 is eliminated, the heat generated in the shape memory alloy wire 56 is released instantaneously through the insulating heat conductors 58 (the first member 58A and the second member 58B). As a result, the shape memory alloy wire 56 is expanded, and returns to its original state (FIG. 4A).

As described above, in the actuator 18, the shape memory alloy wire 56 is contracted by Joule heating, and expanded after Joule heating to thereby change the distance between the first member 58A and the second member 58B, and thus, generate instantaneous vibration (impact). The instantaneous vibration is transmitted to the operation member 16 elastically supported by the base member 14, and the operation part 34 is instantaneously vibrated in the thickness direction of the operation part 34. By the instantaneous operation of the operation part 34, it is possible to provide an operation feeling (click feeling) to the finger of the operator which has touched the operation part 34, like the touch feeling at the time of pressing a mechanical switch.

Figure 5:
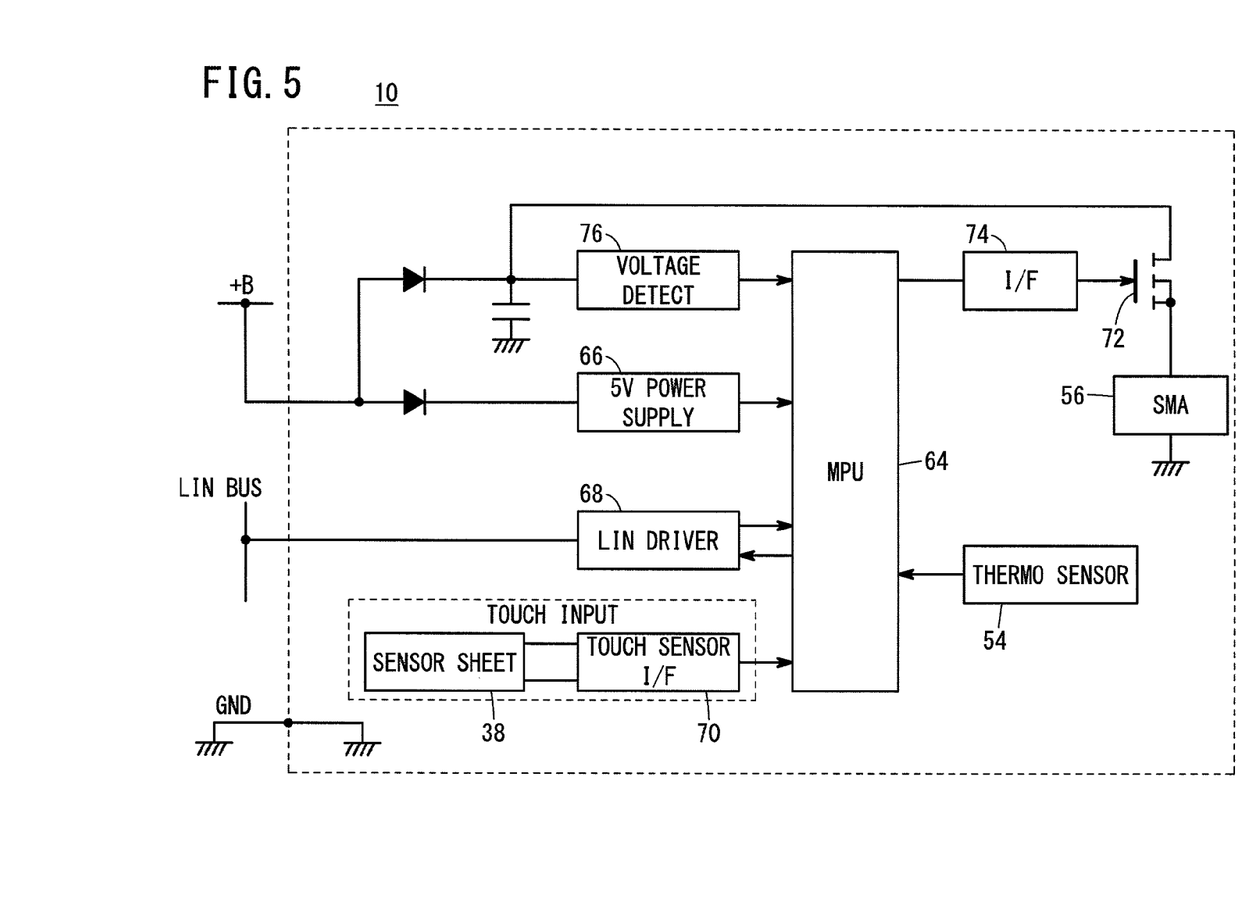
FIG. 5 is a circuit structural diagram of the impact feedback operation device shown in FIG. 1.

Next, electrical structure (circuit) of the operation device 10 will be described. As shown in FIG. 5, the circuit of the operation device 10 includes a processing unit 64 made up of an MPU which functions as a CPU, a power supply circuit 66, a communication driver 68, a touch sensor sheet 38, a touch sensor interface 70, a switch 72, an SMA control interface 74, and a shape memory alloy wire 56. The processing unit 64 is integrated in the IC chip 52 (see FIG. 2).

The power supply circuit 66 regulates a voltage (e.g., 12V) supplied from the power supply (battery) of the vehicle 13 as the object structural body 12 to an operating voltage (e.g., 5V) of the processing unit 64, and supplies the operating voltage to the processing unit 64. The communication driver 68 relays communication between the communication bus of the vehicle 13 and the processing unit 64. The touch sensor interface 70 outputs a signal in accordance with the input from the touch sensor sheet 38 to the processing unit 64. When contact of the operator's finger with the operation part 34 is detected by the touch sensor sheet 38, the processing unit 64 generates an operation signal, and outputs the generated operation signal to the SMA control interface 74.

For example, the switch 72 comprises a semiconductor switching element such as MOSFET. When the switch 72 is turned on, the voltage supplied from the object structural body 12 is applied to the shape memory alloy wire 56. The SMA control interface 74 generates a pulse signal (single pulse signal) in accordance with an operation signal from the processing unit 64, and outputs the generated pulse signal to the switch 72. The switch 72 is turned on for a time period corresponding to the width of the pulse signal (energization pulse width) from the SMA control interface 74.

As shown in FIG. 5, the circuit of the operation device 10 further includes the above temperature sensor 54, and a voltage sensor 76 (voltage detection unit) for detecting the input voltage supplied from the object structural body 12. The temperature sensor 54 detects (monitors) the ambient temperature, and outputs the detected temperature to the processing unit 64 as a temperature signal. The voltage sensor 76 is electrically connected to the power supply of the vehicle 13 as the object structural body 12 (see FIG. 1) in parallel to the above described switch 72. The voltage sensor 76 detects (monitors) the input voltage from the power supply, and outputs a voltage signal corresponding to the detected input voltage, to the processing unit 64.

Next, effects and advantages of the operation device 10 as described above will be described.

When the operator's finger contacts the surface 34a of the operation part 34 of the operation member 16, the touch sensor sheet 38 provided on the operation part 34 responds to the contact, and the processing unit 64 detects that a predetermined operation portion in the operation part 34 has been operated, through the touch sensor interface 70. The processing unit 64 outputs operation information to the vehicle 13, which is the object structural body 12, through the communication driver 68. The equipment on the part of the vehicle 13 performs predetermined operation based on the operation information from the operation device 10.

Further, concurrently with the above operation (processing), the operation device 10 detects the ambient temperature and the input voltage by the temperature sensor 54 and the voltage sensor 76, respectively. In correspondence with the detected ambient temperature and the detected input voltage, energization conditions required for a desired actuation of the shape memory alloy wire 56 are determined, and the shape memory alloy wire 56 is energized. Therefore, it is possible to generate vibration (impact) by the shape memory alloy wire 56 regardless of the environment (ambient temperature and the input voltage).

More specifically, based on the ambient temperature detected by the temperature sensor 54, the processing unit 64 calculates the quantity of heat required for actuation of the shape memory alloy wire 56, or selects the quantity of heat from a first map which has been prepared beforehand. In this case, the first map is a map describing the correlation between the ambient temperature and the above required quantity of heat.

Next, based on the calculated or selected required quantity of heat and the input voltage detected by the voltage sensor 76, the processing unit 64 calculates the energization pulse width, or selects the energization pulse width from a second map which has been prepared beforehand. In this case, the energization pulse width t can be calculated from the following equation (1):

$$t = Q/(V^2/R) \tag{1}$$

where t denotes the energization pulse width, Q denotes the required quantity of heat, R denotes the resistance value of the shape memory alloy wire 56, and V denotes the input voltage.

It should be noted that the second map is a map describing the relationship between the input voltage and the energization pulse width for each required quantity of heat. The second map may be a map describing the relationship between the required quantity of heat and the energization pulse width for each input voltage.

Then, the processing unit 64 generates an operation signal in correspondence with the calculated or selected energization pulse width, and outputs the generated operation signal to the SMA control interface 74. The SMA control interface 74 generates a pulse signal (single pulse signal) in accordance with the operation signal from the processing unit 64, and outputs the generated pulse signal to the switch 72. The switch 72 is turned on for a period of time corresponding to the width (energization pulse width) of the pulse signal from the SMA control interface 74. By turning on the switch 72, the input voltage is applied to the shape memory alloy wire 56, and the shape memory alloy wire 56 is energized.

As described above, the operation device 10 energizes the shape memory alloy wire 56 for the energization time period in correspondence with the detected ambient temperature and the input voltage. Thus, it becomes possible to generate the desired vibration acceleration (impact) by the actuator 18 regardless of the environment (temperature changes and voltage fluctuations).

That is, as in the case of the conventional technique, if Joule heating of the shape memory alloy wire 56 is performed at a fixed pulse width all the time without considering the ambient temperature, acceleration of vibration is lowered or the shape memory alloy wire 56 is not actuated at low temperature, and conversely, the shape memory alloy wire 56 is actuated more than necessary at high temperature. Further, as in the case of the conventional technique, if Joule heating of the shape memory alloy wire 56 is performed at a fixed pulse width all the time without considering the input voltage, acceleration of vibration is lowered or the shape memory alloy wire 56 is not actuated at low voltage, and conversely, the shape memory alloy wire 56 is actuated more than necessary at high voltage.

In contrast, in the operation device 10 of the present invention, both of the ambient temperature and the input voltage are taken into consideration. The energization pulse width is set to be long at low temperature or low voltage, and conversely, the energization pulse width is set to be short at high temperature or high voltage. In this manner, it is possible to actuate the shape memory alloy wire 56 at a desired vibration acceleration.

Further, in the operation device 10, the base member 14 and the operation member 16 are engaged with (fixed to) each other through the elastic portion 28A made of elastic material. The elastic portion 28A is sandwiched between the base member 14 (claw 26) and the operation member 16 (engagement hole 40) in an elastically compressed state. Therefore, the elastic portion 28A elastically biases the operation member 16 toward the actuator 18. Thus, the operation member 16 elastically presses the actuator 18 against the base member 14 through the circuit board 20 by the elastic force of the elastic portion 28A all the time. Accordingly, it is possible to absorb variation of the dimension of components of the operation device 10.

In the above structure, the base member 14, the actuator 18 (the first member 58A, the second member 58B, the shape memory alloy wire 56), the circuit board 20, and the operation member 16 are stacked in the thickness direction (indicated by the arrow A) of the operation device 10. Among these members, those that are adjacent to each other in the stacking direction are placed in close contact with each other all the time by the elastic force of the elastic portion 28A. Further, when the actuator 18 is actuated, the elastic portion 28A is further compressed. Thus, the operation member 16 is allowed to be displaced relative to the base member 14 in the thickness direction of the operation part 34. That is, it is possible to ensure that the operation member 16 (operation part 34) has the sufficient range of movement.

As described above, the members that are adjacent to each other in the stacking direction tightly contact each other all the time, and it is ensured that the operation member 16 has the sufficient range of movement. Therefore, vibration generated by the actuator 18 can be transmitted to the operation part 34 efficiently, and it is possible to provide a clear operation feeling to the operator's finger. Further, since the elastic portion 28A is provided at the position where the claw 26 and the engagement hole 40 are engaged with each other, it is possible to suppress the number of components, improve the productivity, and achieve cost reduction and size reduction of the product, owing to simplification of structure.

Additionally, in the operation device 10 according to the embodiment of the present invention, the thin-walled portion 46 (see FIGS. 1 and 3) surrounding the operation part 34 is provided between the operation part 34 and the side walls 36 in the operation member 16. The fixing seat 50 is provided inside the thin-walled portion 46, and vibration generated by the actuator 18 is transmitted to the operation part 34 through the fixing seat 50. In the structure, since the rigidity at the position of the thin-walled portion 46 is lowered, the thin-walled portion 46 functions as an elastic portion (which is different from the elastic portion 28A) which is deformed elastically. Therefore, vibration generated by the actuator 18 is at least partially absorbed by the thin-walled portion 46. Thus, transmission of the vibration generated by the actuator 18 to the side walls 36 is suppressed. Conversely, the operation part 34 can be vibrated easily. In the structure, vibration from the actuator 18 can be transmitted to the operation part 34 much more efficiently, and it is possible to provide an even more suitable operation feeling to the operator.

Further, in the operation device 10 according to the embodiment of the present invention, by the guide mechanism made up of the guide rails 30 (see FIG. 2) and the guide projections 44 (see FIG. 3), inclination of the operation member 16 relative to the base member 14 is prevented, and the operation member 16 is allowed to be displaced relative to the base member 14. In the structure, vibration from the actuator 18 can be transmitted to the operation part 34 even more efficiently.

In particular, the operation device 10 according to the embodiment of the present invention is in the form of an in-vehicle operation device. Significant changes occur in the vehicle compartment of the vehicle 13 easily. Additionally, the voltage fluctuation occurs easily depending on the traveling states of the vehicle (e.g., operating or stopping of the engine, or charging of the electrical automobile, or the like), and vibration occurs during traveling. In the case that the operation device 10 is used as an in-vehicle operation device, even under the in-vehicle environment as described above, it is possible to provide a constant operating feeling to the operator, and prevent occurrence of abnormal noises due to vibration and rattling at the time of inputting control operations. Therefore, it is possible to reliably satisfy the requirements of quality for the in-vehicle components.

The structure of the elastic portion between the base member 14 and the operation member 16 is not limited to the elastic portion 28A made of the elastic material as described above. As described below, the elastic portion may take various forms.

Figure 6A:
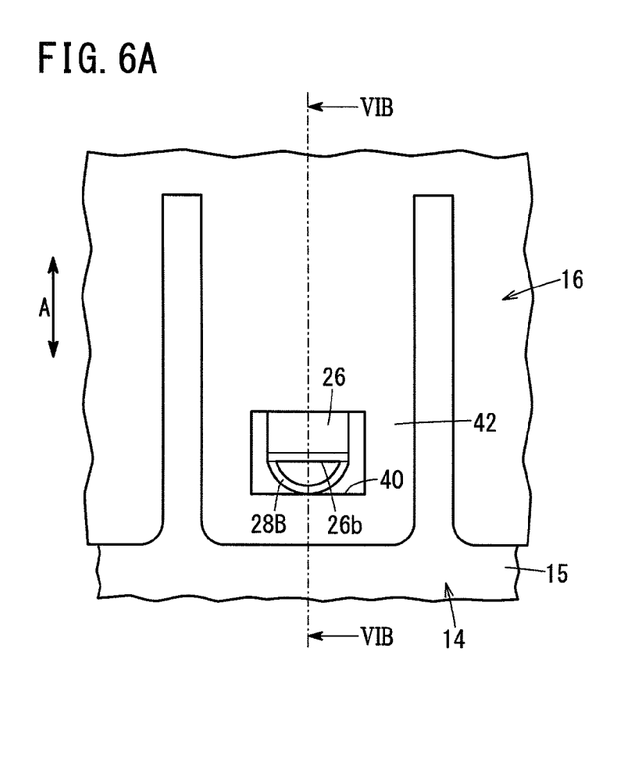
FIG. 6A is a view showing an outer appearance of an elastic portion provided between a base member and an operation member according to a first modified embodiment and its peripheral part.
Figure 6B:
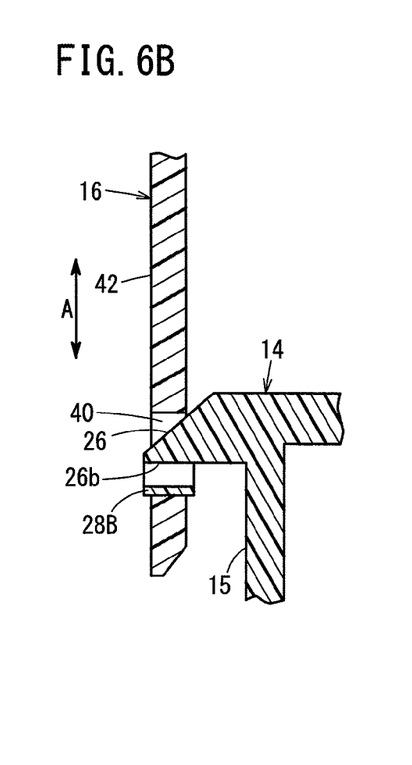
FIG. 6B is a cross sectional view taken along a line VIB-VIB in FIG. 6A.

The elastic portion 28B shown in FIGS. 6A and 6B is provided on the claw 26, and formed into a shape having spring property. More specifically, the elastic portion 28B is a plate-shaped element which is bent to have a circular arc shape. The elastic portion 28B is formed integrally with a lower surface 26b of the claw 26 so as to protrude downward.

In the state where the operation member 16 is fixed to the base member 14, the elastic portion 28B is sandwiched between the claw 26 and the engagement hole 40 (inner surface of the engagement hole 40), and is deformed compressively elastically. In the structure, the elastic portion 28B elastically biases the operation member 16 toward the actuator 18 (see FIG. 1). Therefore, also in the case where the elastic portion 28B of this type is provided, the same effects and advantages can be obtained as in the case where the elastic portion 28A having the above elastic material is provided. The elastic portion 28B may be provided on an inner surface of the engagement hole 40 that faces the lower surface 26b of the claw 26.

Figure 7A:
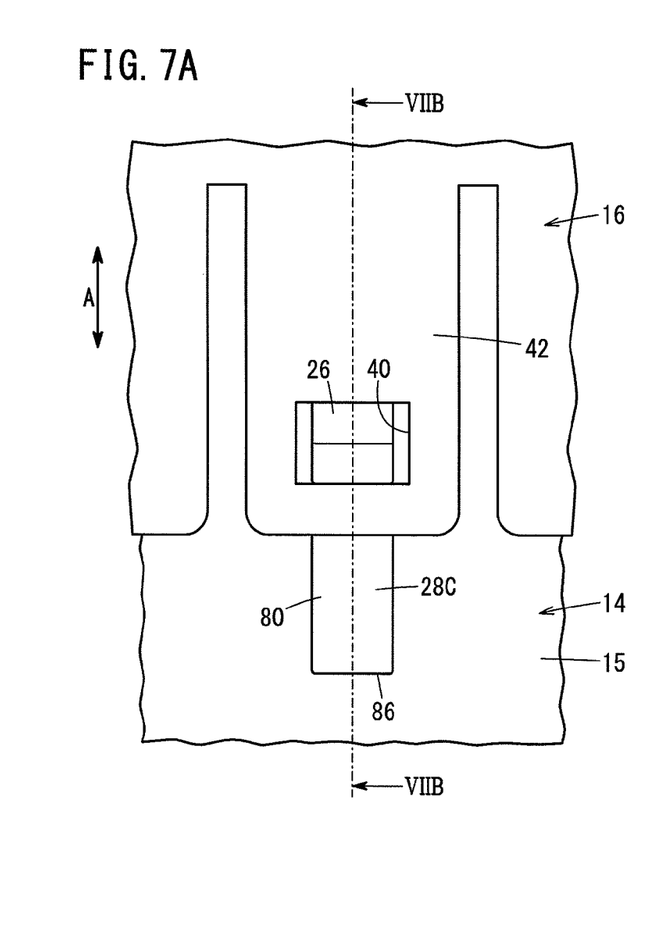
FIG. 7A is a view showing an outer appearance of an elastic portion provided between a base member and an operation member according to a second modified embodiment and its peripheral part.
Figure 7B:
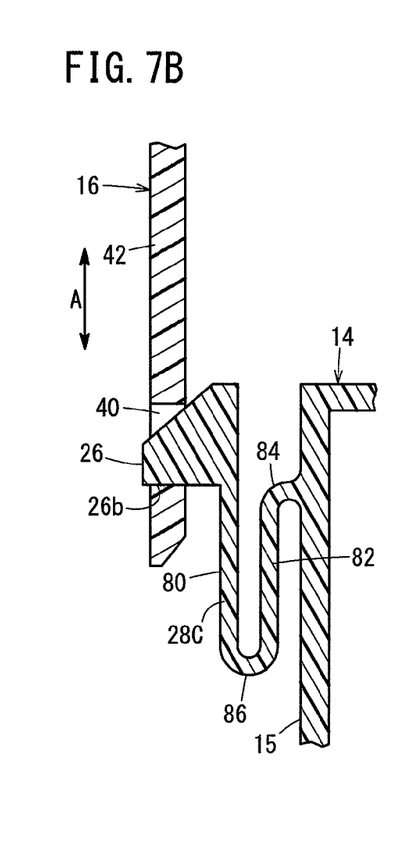
FIG. 7B is a cross sectional view taken along a line VIIB-VIIB in FIG. 7A.

An elastic portion 28C shown in FIGS. 7A and 7B is provided between the base member 14 and the claw 26. That is, the claw 26 is provided on the base member 14 through the elastic portion 28C. The elastic portion 28C is formed into a shape having spring property. The elastic portion 28C supports the claw 26 in a displaceable manner in the thickness direction (indicated by the arrow A) of the operation part 34. In the case of the elastic portion 28C in the illustrated example, a plurality of (two) flat plate portions 80, 82 in parallel to each other, and a plurality of (two) curved portions 84, 86 are provided. In the structure, the claw 26 is elastically supported by the base member 14. It should be noted that the elastic portion 28C may be formed by one flat portion and one curved portion.

In the state where the operation member 16 is fixed to the base member 14, the claw 26 is engaged with the engagement hole 40, and the elastic portion 28C is deformed elastically to support the claw 26. By operation of the elastic restoration force of the elastic portion 28C, the elastic piece 42 of the operation member 16 is pulled downward (in the direction in which the elastic piece 42 protrudes) by the claw 26. In the structure, the elastic portion 28C elastically biases the operation member 16 toward the actuator 18 (see FIG. 1). Therefore, also in the case where the elastic portion 28C of this type is provided, the same effects and advantages are obtained as in the case where the elastic portion 28A made of elastic material as described above is provided. The elastic portion 28C may be provided on the elastic piece 42.

In the operation device 10 having the above structure, the elastic portions 28A, 28B, 28C between the base member 14 and the operation member 16 may be omitted, and the claw 26 may be engaged directly with the engagement hole 40. Also in this case, the thin-walled portion 46, which is provided between the operation part 34 and the side walls 36, functions as an elastic portion which is elastically deformable to allow displacement of the operation part 34 relative to the base member 14 in the direction indicated by the arrow A when the actuator 18 is actuated. Therefore, even in the case where the elastic portions 28A, 28B, and 28C are omitted, since the thin-walled portion 46 is present, it is possible to transmit the vibration generated in the actuator 18 to the operation part 34 efficiently. Alternatively, the elastic portions 28A, 28B, and 28C between the base member 14 and the operation member 16 may be provided, and the thin-walled portion 46 may be omitted.

Figure 1:
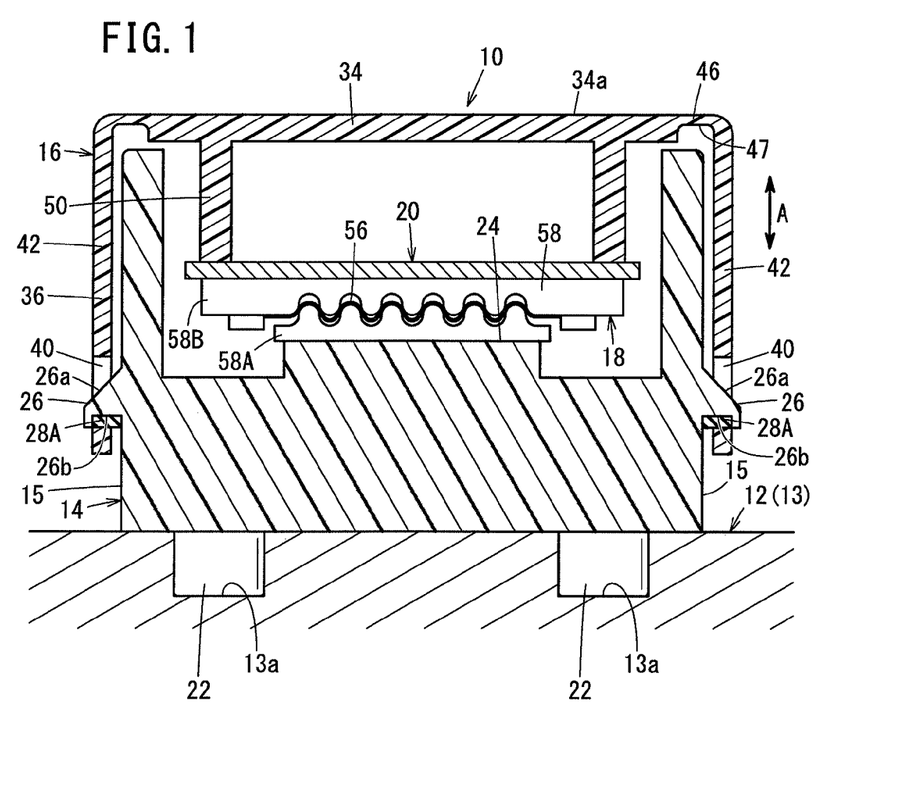
FIG. 1 is a cross sectional view of an impact feedback operation device according to an embodiment of the present invention.

In the operation device 10, the positional relationship between the actuator 18 and the circuit board 20 may be opposite to that shown in FIG. 1. That is, the actuator 18 may be provided between the operation member 16 and the circuit board 20. In this case, the operation member 16 presses the actuator 18 toward the circuit board 20.

In the operation device 10, the claw 26 may be provided on the operation member 16, and the elastic piece 42 having the engagement hole 40 may be provided on the base member 14.

In the operation device 10, instead of the engagement hole 40 which is engaged with the claw 26, an additional claw which is engaged with the claw 26 may be provided on the elastic piece 42.

The present invention is not limited to the above described embodiments. Various modifications can be made without departing from the scope of the present invention.

What is claimed is:

1. An impact feedback operation device comprising:
   a base member fixed to an object structural body, or formed integrally with the object structural body;
   an operation member fixed to the base member, the operation member having an operation part equipped with a touch sensor, at least the operation part being displaceable relative to the base member;
   an actuator including shape memory alloy, the actuator being configured to move the operation part relative to the base member by deformation of the shape memory alloy at a time of Joule heating;
   a temperature detection unit configured to detect ambient temperature;
   a voltage detection unit configured to detect input voltage supplied from the object structural body; and
   a processing unit configured to control the actuator,
   wherein the processing unit determines an energization condition required for the shape memory alloy at the time of Joule heating, depending on temperature detected by the temperature detection unit and voltage detected by the voltage detection unit,
   wherein the operation part is fixed to the base member through an elastically deformable elastic portion, and
   wherein the processing unit is configured to:
   calculate or select from a first map, a quantity of heat required for actuation of the shape memory alloy, based on the temperature detected by the temperature detection unit, and
   calculate or select from a second map, an energization pulse width for control of the shape memory alloy, based on the calculated quantity of heat and the voltage detected by the voltage detection unit.

2. The impact feedback operation device according to claim 1, wherein the base member is provided with a first engagement portion,
   wherein the operation member is provided with a second engagement portion, and
   wherein the first engagement portion and the second engagement portion are engaged with each other through the elastic portion.

3. The impact feedback operation device according to claim 2, wherein the elastic portion is made of elastic material.

4. The impact feedback operation device according to claim 2, wherein the elastic portion is formed into a shape having spring property, and provided on the first engagement portion or the second engagement portion.

5. The impact feedback operation device according to claim 2, wherein the operation member includes a side wall provided with the second engagement portion, and
   wherein a thin-walled portion is formed between the operation part and the side wall, and the thin-walled portion is thinner than the operation part and surrounds the operation part.

6. The impact feedback operation device according to claim 5, wherein a fixing seat is provided inside the thin-walled portion, and
   wherein vibration generated by the actuator is transmitted to the operation part through the fixing seat.

7. The impact feedback operation device according to claim 1, wherein the base member is provided with a first engagement portion,
   wherein the operation member is provided with a second engagement portion,
   wherein the elastic portion is formed into a shape having spring property, and
   wherein the first engagement portion or the second engagement portion is provided on the base member or the operation member through the elastic portion.

8. The impact feedback operation device according to claim 1, wherein the operation member includes a side wall,
   wherein a thin-walled portion is formed between the operation part and the side wall, and the thin-walled portion is thinner than the operation part and surrounds the operation part, and
   wherein the thin-walled portion forms the elastic portion.

9. The impact feedback operation device according to claim 1, further comprising a guide mechanism configured to prevent inclination of the operation member relative to the base member and allow displacement of the operation member relative to the base member,
   wherein the guide mechanism comprises a guide rail provided on the base member and a guide projection provided on the operation member slidably along the guide rail.

10. The impact feedback operation device according to claim 1, wherein the impact feedback operation device is an in-vehicle operation device.

\* \* \* \* \*